US010853929B2

United States Patent
Vasanthakumar

(10) Patent No.: US 10,853,929 B2
(45) Date of Patent: Dec. 1, 2020

(54) METHOD AND A SYSTEM FOR PROVIDING FEEDBACK ON IMPROVISING THE SELFIES IN AN ORIGINAL IMAGE IN REAL TIME

(71) Applicant: Rekha Vasanthakumar, Pune (IN)

(72) Inventor: Rekha Vasanthakumar, Pune (IN)

( * ) Notice: Subject to any disclaimer, the term of this patent is extended or adjusted under 35 U.S.C. 154(b) by 102 days.

(21) Appl. No.: 16/166,938

(22) Filed: Oct. 22, 2018

(65) Prior Publication Data
US 2019/0057497 A1 Feb. 21, 2019

(30) Foreign Application Priority Data

Jul. 27, 2018 (IN) .............................. 201821028413

(51) Int. Cl.
*G06T 7/00* (2017.01)
*G06K 9/00* (2006.01)
*H04N 5/232* (2006.01)

(52) U.S. Cl.
CPC ........ *G06T 7/0002* (2013.01); *G06K 9/00208* (2013.01); *G06K 9/00275* (2013.01); *G06K 9/00281* (2013.01); *G06K 9/00302* (2013.01); *H04N 5/23219* (2013.01); *H04N 5/23222* (2013.01); *H04N 5/232939* (2018.08)

(58) Field of Classification Search
CPC ........... G06K 9/00208; G06K 9/00275; G06K 9/00281; G06K 9/00302; H04N 5/232939; H04N 5/23219; H04N 5/23222; G06T 7/0002
See application file for complete search history.

(56) References Cited

U.S. PATENT DOCUMENTS

| 6,816,847 | B1 | 11/2004 | Toyama |
| 8,041,076 | B1 | 10/2011 | Bourdev |
| 2014/0242560 | A1 | 8/2014 | Movellan et al. |
| 2015/0242707 | A1 | 8/2015 | Wilf |
| 2016/0379050 | A1* | 12/2016 | Tian ................... G06K 9/00288 382/118 |
| 2017/0330029 | A1 | 11/2017 | Turcot et al. |

FOREIGN PATENT DOCUMENTS

WO WO2017177259 A1 10/2017

* cited by examiner

*Primary Examiner* — Leon Flores
(74) *Attorney, Agent, or Firm* — Myers Wolin, LLC

(57) ABSTRACT

A method (200) for providing feedback regarding facial expressions in an original image is provided. The method (200) comprising the steps of receiving a 2-dimensional image of one or more users from an image capturing device (102), converting the 2-dimensional image to 3-dimensional image, identifying respective one or more faces of the one or more users from the 3-dimensional image, determining values of a set of plurality of parameters associated with a plurality of sections of each face of the one or more faces, comparing the determined values of the set of plurality of parameters with pre-determined optimum values of set of plurality of parameter pre-stored in a data repository (108) and providing feedback to the one or more users on the basis of the comparison. Further, a system (700) for providing feedback regarding facial expressions in an original image is provided.

8 Claims, 7 Drawing Sheets

METHOD AND A SYSTEM FOR PROVIDING FEEDBACK ON IMPROVISING THE SELFIES IN AN ORIGINAL IMAGE IN REAL TIME

CROSS REFERENCE TO RELATED APPLICATIONS

This application claims priority under 35 U.S.C. § 119 to Indian Patent Application No. 201821028413, filed Jul. 27, 2018, the contents of which are incorporated by reference herein.

FIELD OF THE INVENTION

Embodiments of the present invention generally relates facial recognition technologies and more particularly to a method and a system for providing feedback on improvising the selfies in an original image in real time.

BACKGROUND OF THE INVENTION

With the introduction of advanced technologies in portable devices, especially front camera, users are getting addicted to take pictures on their own usually termed as 'selfies'. Users would spend considerable time to click a desired picture in a pose which involves clicking multiple images in burst or still mode and then manually work through tens or hundreds of photos to get the desired one without any distortions. Also, professional photographers do have similar problems in capturing best desired photographs of the customers, as they need to refer to a big screen for confirming the desired accurateness of the picture.

Conventionally, there have been multiple solutions to provide instant feedback to users in respect of their pictures. Most of the solutions focus towards measuring the facial attractiveness using various ratio from face features, few of them are discussed below:

US2015242707A1 discloses a method to predicts the human personality trait. The method uses the machine learning and training associated with the image of a person and then comparing it to the image of second person's different images captured by users.

U.S. Pat. No. 6,816,847B1 discloses a method to use the image to generate an aesthetic score. This generated score is then processed through the database and provides recommendation to improve the aesthetic score of image by manipulation of visual elements of image.

US2014242560A1 discloses a system and a method to use the capturing data representing facial expression appearance of the user and processing it through machine learning to recognise faces and facial expression with the help of conventional neural network.

US2017330029A1 discloses a method to identify a facial portion and facial expression. The technology uses a conventional neural network to perform machine learning to identify the faces in captured image.

Though the aforesaid documents and other existing methods/systems strive to provide solutions to the problem discussed above, however, most or all of them come with a number of limitations or shortcomings, such as complex post capture processing of images, fails to depict original image as suggestion, face feature measurements not common across different ethnicity, not able to detect the facial attractiveness for both frontal & profile faces and there is no suggestion of perfect face angle at which maximum attractiveness can be achieved by the person himself/herself in an original image.

Therefore, there remains a need in the art for a method and a system for providing feedback on improvising the selfies in an original image in real time.

Any discussion of the background art throughout the specification should in no way be considered as an admission that such background art is prior art nor that such background art is widely known or forms part of the common general knowledge in the field worldwide.

OBJECT OF THE INVENTION

An object of the present invention is to provide a method for determining the top attractive selfies and providing feedback on improvising the selfies among the set of non-filtered original images. This method should be designed common for frontal as well as profile views of images and also across geographical regions.

Another object of the present invention is to provide a system for determining the top attractive selfies and providing feedback on improvising the selfies among the set of non-filtered original images. This system should work common for frontal as well as profile views of images and also across geographical regions.

Another object of the present invention is to capture the selfies of a person in different poses in real time as a live stream and identify the faces in each of the captured image Another object of the present invention is to calculate the face area, Iris area, Sclera area, Nostril area, Nose area, Upper lip area, Lower lip area, Lips dark area for each of the faces.

Another object of the present invention is to compare the face area with each of the above measured areas.

Another object of the present invention is to compare this measured data with the trained data set from neural network based deep learning.

Another object of the present invention is to determine the top attractive selfies based on the rating using the above measurements.

Another object of the present invention is to convert the captured face from 2 dimensional to 3 dimensional.

Another object of the present invention is to determine the various combinations of yaw-pitch-roll for the different angles of faces.

Another object of the present invention is to measure the face features for each of these combinations and compare them with the data set repository to determine the ideal angle at which the face should be inclined to make it look attractive.

A yet another object of the present invention is to suggest users on poses, ideal angle of face, facial expressions to improve attractiveness of selfies.

SUMMARY OF THE INVENTION

Embodiments of the present invention aim to provide a method and a system for providing feedback on improvising the selfies in an original image. The invention enables a user to get a feedback on the image captured by him/her without any artificial enhancements. Further, the invention enables the user to capture images in real time and show only the collection of images that are good looking or attractive. The user will also get recommendations on how to improve his/her posture, facial expression, face inclination angle to get attractive pictures. Also, the present invention is able to detect the facial attractiveness for both frontal & profile faces and can be applied common across geographical regions.

According to a first aspect of the present invention there is provided, a method for determining the top attractive selfies among the set of non-filtered original images and providing feedback regarding poses, ideal angle of faces and facial expressions. The method comprising the steps of receiving 2-dimensional images of one or more users from an image capturing device, identifying respective one or more faces of the one or more users from the 2-dimensional image, estimating the face area and the values of a set of plurality of parameters associated with a plurality of sections of each face of the one or more faces, estimating the proportion of each of the values of set of plurality of parameters against the face area, then comparing the estimated proportion values with the pre-determined optimum values of set of plurality of parameter pre-stored in a data repository and determining the top most attractive selfies on the basis of the comparison. The method also include converting the identified 2-dimensional face to 3-dimensional face, determining the various combinations of yaw-pitch-roll for the different angles of faces, estimating the face area and the values of a set of plurality of parameters associated with a plurality of sections of each face of the one or more combinations of the yaw-pitch-roll, estimate the proportion of the values of the set of plurality of parameters against the face area, comparing the estimated proportion values with the pre-determined optimum values of set of plurality of parameter pre-stored in a data repository and suggest users on poses, ideal angle of face, facial expressions to improve attractiveness on the basis of the comparison.

In accordance with an embodiment of the present invention, the image capturing device is selected from a group of, but not limited to, a digital camera, a handy cam, a camera-enabled smartphone.

In accordance with an embodiment of the present invention, the step of identifying respective one or more faces further comprises a step of marking the plurality of sections of the respective one or more faces. Preferably, the plurality of sections are selected from, but not limited to iris area, sclera area, nostril area, nose area, upper lip area, lower lip area and lips dark area.

According to a second aspect of the present invention, there is provided a computer system for providing feedback regarding facial expressions in an original image. The computer system comprises a memory unit configured to store machine-readable instructions and a processor operably connected with the memory unit, the processor obtaining the machine-readable instructions from the memory unit, and being configured by the machine-readable instructions to receive 2-dimensional images of one or more users from an image capturing device, identify respective one or more faces of the one or more users from the 2-dimensional images, estimate the face area and the values of a set of plurality of parameters associated with a plurality of sections of each face of the one or more faces, estimate the proportion of each of the values of set of plurality of parameters against the face area, then compare the estimated proportion values with the pre-determined optimum values of set of plurality of parameter pre-stored in a data repository. The processor is also configured to convert the 2-dimensional image to 3-dimensional image, determine the various combinations of yaw-pitch-roll for the different angles of faces, estimate the face area and the values of a set of plurality of parameters associated with a plurality of sections of each face of the one or more combinations, estimate the proportion of each of the values of set of plurality of parameters against the face area, then compare the estimated proportion values with the pre-determined optimum values of set of plurality of parameter pre-stored in a data repository and display top 10 attractive selfies to the one or more users on the basis of the comparison and also to provide feedback on poses, ideal angle of face, facial expressions to improve attractiveness to the one or more users on the basis of the comparison.

In accordance with an embodiment of the present invention, the image capturing device is selected from a group of, but not limited to, a digital camera, a handy cam or a camera-enabled smartphone.

In accordance with an embodiment of the present invention, the step of identifying respective one or more faces further comprises a step of marking the plurality of sections of the respective one or more faces. Preferably, the plurality of sections are selected from, but not limited to, iris area, sclera area, nostril area, nose area, upper lip area, lower lip area and lips dark area.

In accordance with an embodiment of the present invention, a system for determining the top attractive selfies and providing feedback on improvising the selfies among the set of non-filtered original images. This system should work common for frontal as well as profile views of images and also across geographical regions. The system comprising an image capturing device, an interface module and a control module. The control module is configured to receive 2-dimensional images of one or more users from an image capturing device, identify respective one or more faces of the one or more users from the 2-dimensional images, estimate the face area and the values of a set of plurality of parameters associated with a plurality of sections of each face of the one or more faces, estimate the proportion of each of the values of set of plurality of parameters against the face area, then compare the estimated proportion values with the pre-determined optimum values of set of plurality of parameter pre-stored in a data repository. The control module is also configured to convert the 2-dimensional image to 3-dimensional image, determine the various combinations of yaw-pitch-roll for the different angles of faces, estimate the face area and the values of a set of plurality of parameters associated with a plurality of sections of each face of the one or more combinations, estimate the proportion of each of the values of set of plurality of parameters against the face area, then compare the estimated proportion values with the pre-determined optimum values of set of plurality of parameter pre-stored in a data repository. Further, the interface module is configured to display top 10 attractive selfies to the one or more users on the basis of the comparison and also to provide feedback on poses, ideal angle of face, facial expressions to improve attractiveness to the one or more users on the basis of the comparison.

In accordance with an embodiment of the present invention, the image capturing device is selected from a group of, but not limited to, a digital camera, a handy cam or a camera-enabled smartphone.

In accordance with an embodiment of the present invention, the step of identifying respective one or more faces further comprises a step of marking the plurality of sections of the respective one or more faces. Preferably, the plurality of sections are selected from, but not limited to iris area, sclera area, nostril area, nose area, upper lip area, lower lip area and lips dark area.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE DRAWINGS

Figure 1:
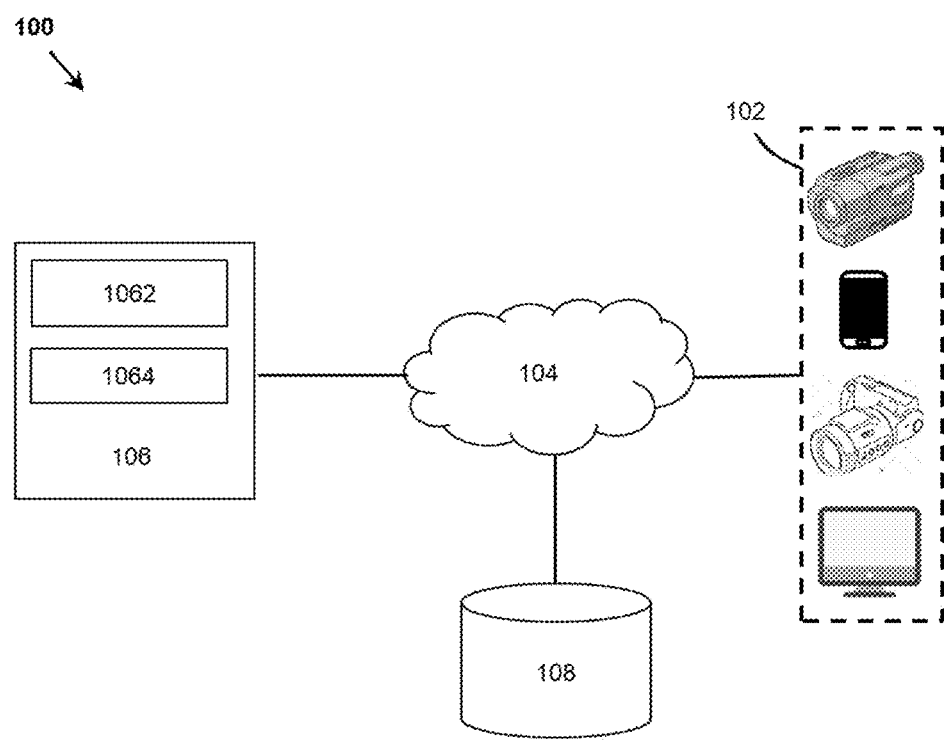
FIG. 1 is an exemplary environment of computing devices to which the various embodiments described herein may be implemented, in accordance with an embodiment of the present invention.

The present invention is described hereinafter by various embodiments with reference to the accompanying drawing, wherein reference numerals used in the accompanying drawing correspond to the like elements throughout the description.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Further, the various embodiments described herein below include specific method steps in an exemplary order but a wide variety of other such method steps could be implemented within the scope of the invention, including additional steps, omission of some steps, or performing the method in a different order.

The present invention aims to overcome the drawbacks of the prior art by enabling determination of facial beauty in real time that works for both profile & frontal faces and can be applied across geographical regions. The present invention processes the original image of the user by comparing the value of image features with the ideal values of image features and provides feedback in view of a suggestive features to improve the attractiveness, based on the measurements. It can be implemented on mobile camera, desktop and any other devices that can capture the image with this application embedded to process it. However, a person skilled in the art would appreciate that the invention is not limited to the exemplary environment discussed below alone and can be implemented in various other physical environments, without departing from the scope of the invention.

Referring to the drawings, the invention will now be described in more detail. FIG. 1 is an exemplary environment 100 of image capturing devices to which the various embodiments described herein may be implemented. FIG. 1 illustrates an image capturing device 102 associated with a user. A user may be anyone who is capturing pictures of himself/herself/group of people etc. The image capturing device 102 may be selected from a group comprising mobile handheld devices (such as mobile phones, PDA and tablet PCs etc.), desktop PCs and notebooks etc. The image capturing device 102 is envisaged to be connected with one or more input devices (such as a keyboard, a camera, microphone etc.) (not shown) and one or more output devices (such as a display screen, speaker etc.) (not shown). In case of mobile handheld devices such as a smartphone, the one or more input devices and the one or more output devices may be integrally provided. For example in touch-input based camera-enabled smartphone no external devices need to be connected. Whereas in desktop PCs and laptops external cameras, speakers, headphones and microphones may have to be externally connected. The image capturing device 102 is connected with a network 104. The network 104 may be one of, but not limited to, a Local Area Network (LAN) or a Wide Area Network (WAN). The network 104 may be implemented using a number of protocols, such as but not limited to, TCP/IP, 3GPP, 3GPP2, LTE, IEEE 802.x etc.

Further connected to the network 104 is a computer system 106. The computer system 106 may be a portable computing device, a desktop computer or a server stack. The computer system 106 is envisaged to include computing capabilities such as a memory unit 1062 configured to store machine readable instructions. The machine readable instructions may be loaded into the memory unit 1062 from a non-transitory machine-readable medium such as, but not limited to, CD-ROMs, DVD-ROMs and Flash Drives. Alternately, the machine readable instructions may be loaded in a form of a computer software program into the memory unit

1062. The memory unit 1062 in that manner may be selected from a group comprising EPROM, EEPROM and Flash memory.

Further, the computer system 106 includes a processor 1064 operably connected with the memory unit 1062. In various embodiments, the processor 1064 is one of, but not limited to, a general purpose processor, an application specific integrated circuit (ASIC) and a field-programmable gate array (FPGA).

Further connected to the network 104 is a data repository 108. The data repository 108 may be a cloud based storage or a local storage. In any manner, the data repository 108 is envisaged to be capable of providing the data to any of the computing devices connected with the network 104, when the data is queried appropriately using applicable security and other data transfer protocols. The data repository 108 is envisaged to store pre-determined optimum values of set of plurality of parameter. The plurality of parameter associated with plurality of sections of one or more faces. The plurality of sections are selected from face area, iris area, sclera area, nose area, nostril area, upper lip area, lower lip area and lip dark area. Various embodiments of the present invention may now be understood with the exemplary environment 100 as a reference.

Figure 2:
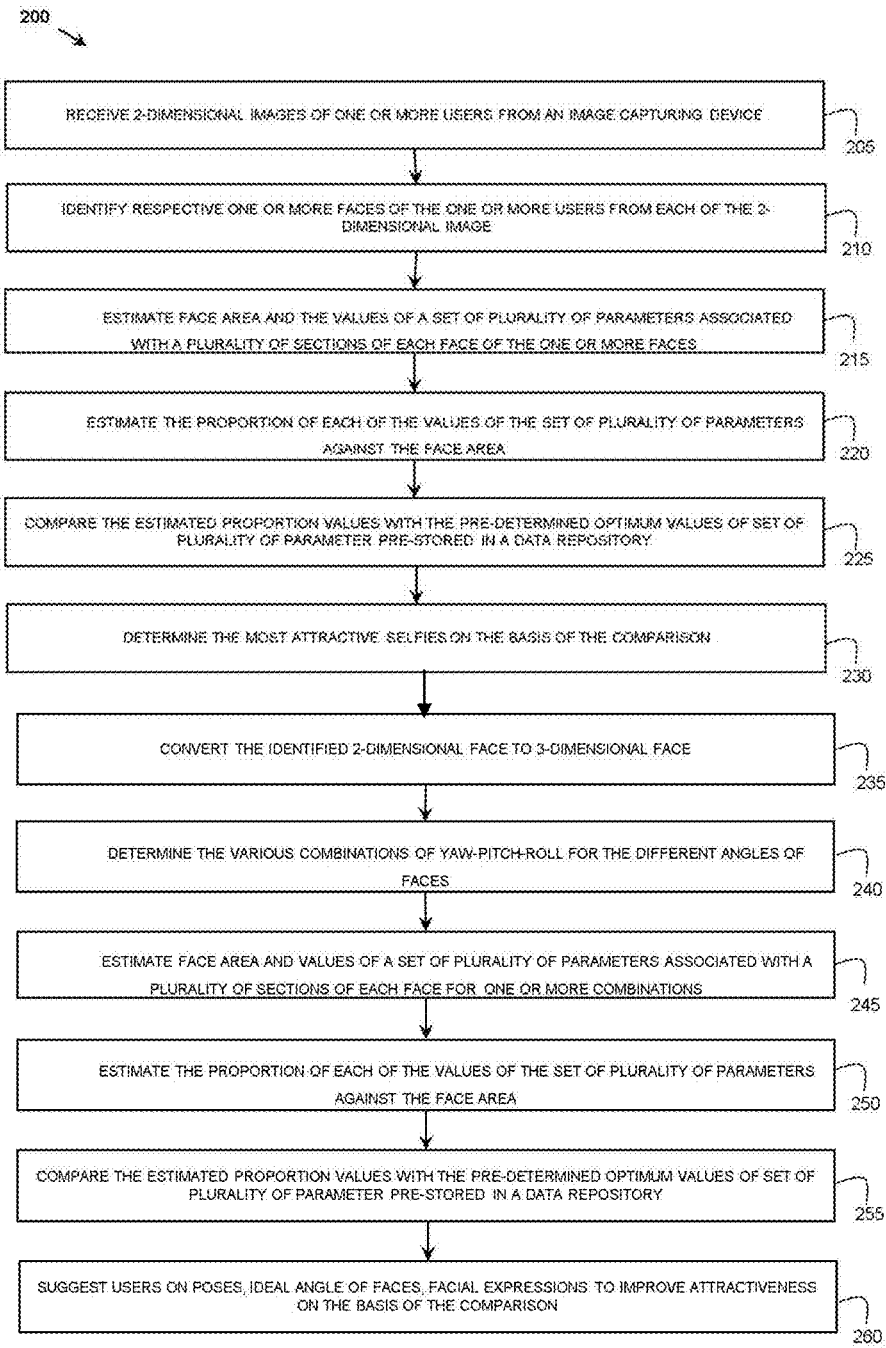
FIG. 2 is a flow chart illustrating a method for determining the top attractive selfies and providing feedback on improvising the selfies in an original image in accordance with an embodiment of the present invention.

FIG. 2 is a flow chart illustrating a method 200 for providing feedback regarding facial expressions in an original image, in accordance with an embodiment of the present invention. The method starts at step 205 where one or more users captures 2-dimensional images from the image capturing device 102. The one or more users may be a single person or group of people who are taking pictures from their image capturing device 102. Further, the 2-dimensional images may comprise of landscapes, building structures however the 2-dimensional images must comprise of at least face of one or more users.

Figure 3:
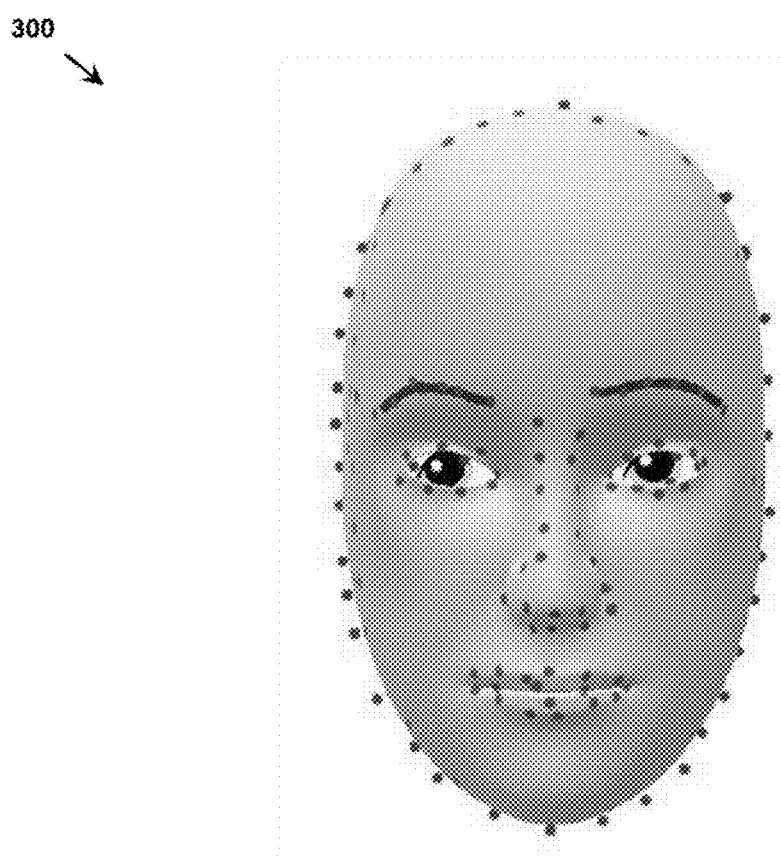
FIG. 3 illustrates marking the plurality of sections to identify the one or more faces of the one or more users, in accordance with an embodiment of the present invention.

At step 210, one or more faces of the one or more users are identified in the captured 2-dimensional images. The step 210 further comprises of a step of marking the plurality of sections of the respective one or more faces, as shown in FIG. 3. As shown in FIG. 3, the plurality of sections of face are landmarked.

At step 215, a set of plurality of parameters associated with a plurality of sections of each face of the one or more faces is estimated. The plurality of parameters are, but not limited to, height, width, breadth etc. of plurality of sections of the respective one or more faces. Area is estimated by the pixel count bounded by a section. The plurality of sections are, but not limited to, face area, iris area, sclera area, nostril area, nose area, upper lip area, lower lip area and lips dark area.

At step 220, the ratio of each of the values of the set of plurality of parameters of the plurality of the sections to the face area is calculated.

At step 225, the estimated ratio output from above are compared with pre-determined optimum values of set of plurality of parameter of the plurality of sections pre-stored in the data repository 108. The pre-determined optimum values are determined by using analysis of data and neural network based deep learning trained data set.

At step 230, based on the data of comparison captured images are rated. With the help of this rating, the top attractive images are displayed to one or more users. Preferably, the rating is in the range of 1 to 10 where 1 representing the worst value and 10 representing the best value.

At step 235, the 2-dimensional image is converted into 3-dimensional image. The step of 235 only converts the 2-dimensional image into 3-dimensional image without interfering the characteristics of the picture and keep them as the original one.

Figure 6:
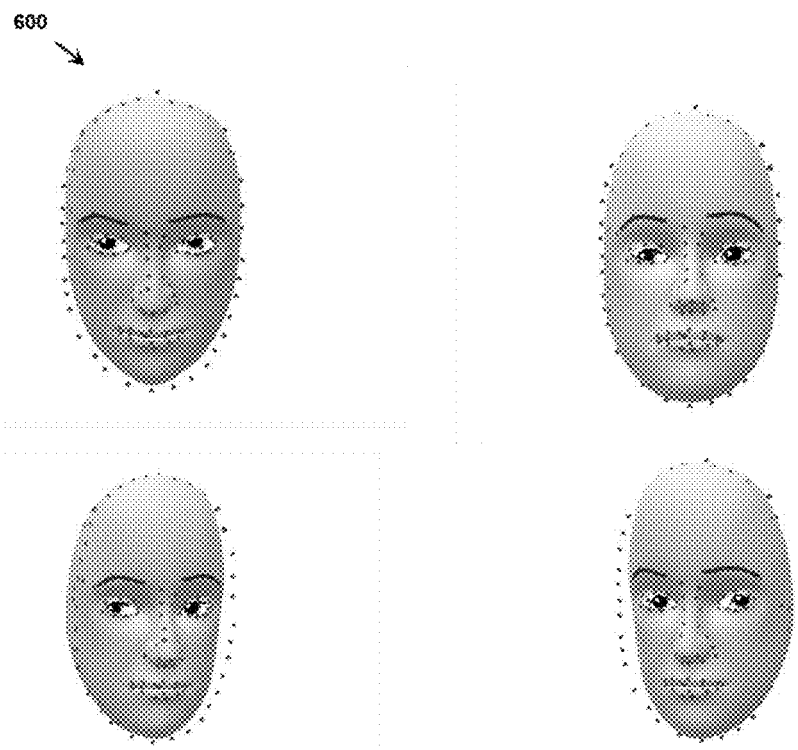
FIG. 6 illustrates the transformed faces of the yaw-pitch rotations of faces marking the plurality of sections to identify the one or more faces of the various combinations in accordance with an embodiment of the present invention.

At step 240, the various combinations of yaw-pitch-roll for the different angles of faces is determined as shown in FIG. 6.

At step 245, a set of plurality of parameters associated with a plurality of sections of each face for each of the yaw-pitch combinations is estimated. The plurality of parameters are, but not limited to, height, width, breadth etc. of plurality of sections of the respective one or more faces. Area is estimated by the pixel count bounded by a section. The plurality of sections are, but not limited to, face area, iris area, sclera area, nostril area, nose area, upper lip area, lower lip area and lips dark area.

At step 250, the ratio of each of the values of the set of plurality of parameters of the plurality of the sections to the face area is calculated.

At step 255, the estimated ratio output from above are compared with pre-determined optimum values of set of plurality of parameter of the plurality of sections pre-stored in the data repository 108. The pre-determined optimum values are determined by using analysis of data and neural network based deep learning trained data set.

At step 260, based on the data of comparison recommendations or suggestions on but not limited to, better pose, facial expressions, ideal angle at which the face look attractive are provided to the user. The suggestions to improvise the selfies are provided, but not limited to, Face area: If the decrease in face area improves the rating, the user can be suggested to tilt his/her head sideways. This is generally applicable to people with broader faces.

Iris area: If the increase in Iris area improves the rating, then the user is suggested to open his eyes little wider or vice versa.

Sclera area: If the increase in the sclera area improves the rating, the user can be asked to look sidewise.

Nostril area: If the reduction in nostril size improves the rating, the user can be asked to tilt his face downwards slightly.

Upper/Lower Lip area: If the increase in Upper/lower lip area improves the rating, the user can be asked to smile broadly.

Lips dark area: If the reduction in lips dark area improves the rating, the user can be asked to use lighter lip shades or vice versa.

Figure 4:
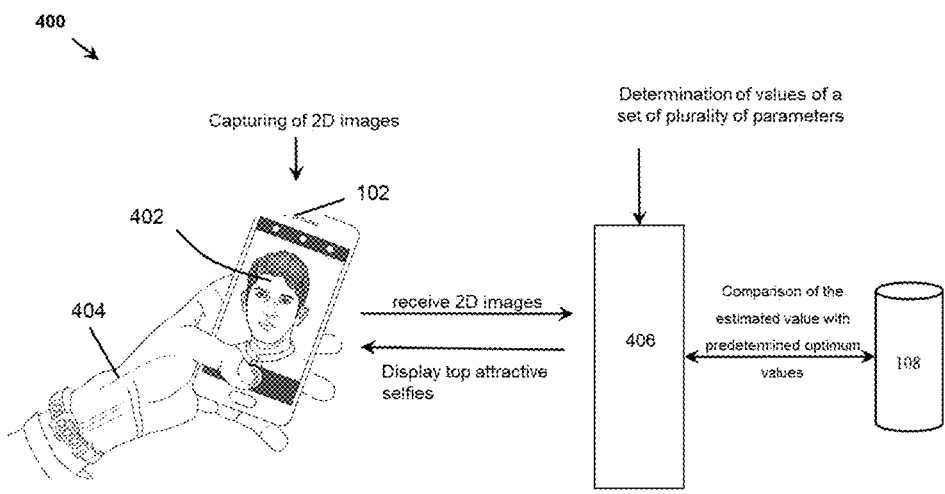
FIG. 4 illustrates an information flow diagram of determining the top attractive among the set of original images.

FIG. 4 illustrates an information flow diagram 400 for determining the top attractive among the set of original images. As shown in FIG. 4, the one or more users 404 captures 2-dimensional images 402 by using his image capturing device 102. Further, the 2-dimensional images 402 are received by the system 406. One or more faces of the one or more users from each of the 2-dimensional image is identified and the values of a set of plurality of parameters associated with a plurality of sections of each face of the one or more faces is estimated by the system 406. The proportion of each of the values of the set of plurality of parameters against the face area is estimated by the system 406 and then these proportion values are compared with the pre-determined optimum values of set of plurality of parameter pre-stored in a data repository 108. Based on this comparison, determine the top most attractive images and display it to the one or more users. Preferably, the attractiveness rating is in the form of respective values of the set of plurality of parameters in the range of 1 to 10 where 1 representing the worst value and 10 representing the best value.

Figure 5:
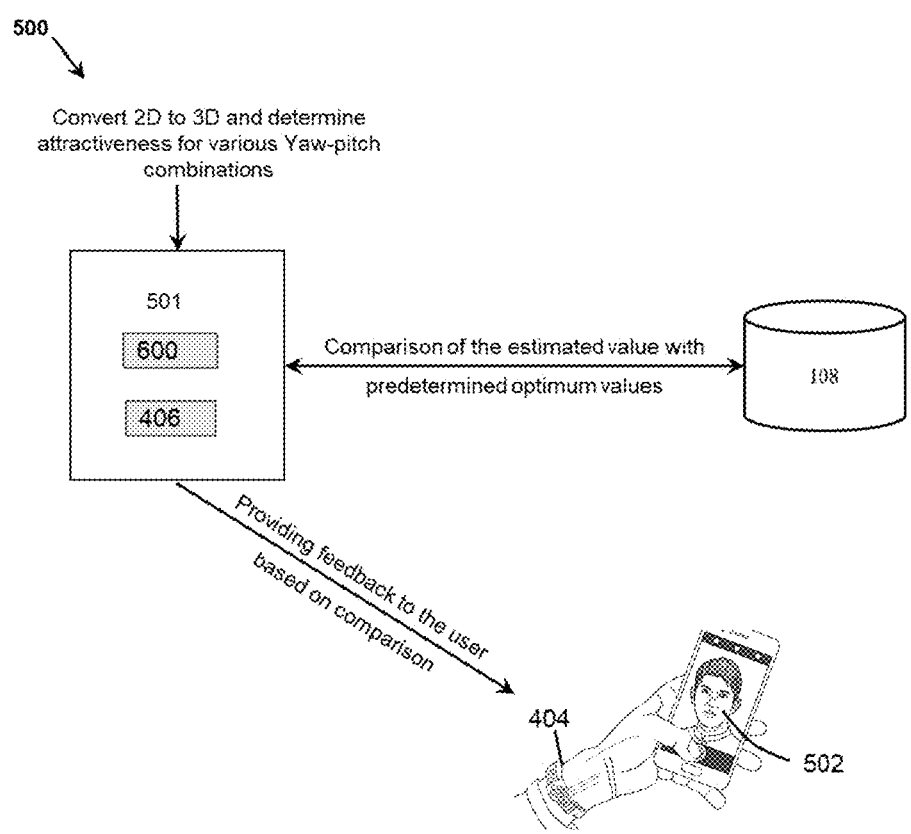
FIG. 5 illustrates an information flow diagram of providing feedback on improvising the selfies in the original images.

FIG. 5 illustrates an information flow diagram 500 for providing feedback on improvising the selfie in the original image. As shown in FIG. 5, the system 501 converts the input 2D face to 3D face, determine the various yaw-pitch-roll combinations 600 of the 3D face, determine a set of plurality of parameters associated with a plurality of sections of each face 600 of the one or more combinations. The plurality of parameters are, but not limited to, height, width, breadth, pixel count etc. of plurality of sections of the respective one or more faces. The plurality of sections are, but not limited to, Iris area, scalera area, nose area, nostril area, upper lip area, lower lip area, lip dark area and face area. Further, the system 501 calculate the proportion of the values of the plurality of parameters of the plurality of sections against the face and then compare the estimated proportion values with the pre-determined optimum values of set of plurality of parameter pre-stored in the data repository 108. The pre-determined optimum values are determined by using analysis of data and neural network based deep learning trained data set. Thereafter, the system 501 provides feedback to one or more user 404. The suggestions to improvise the selfies are provided, but not limited to, Face area: If the decrease in face area improves the rating, the user can be suggested to tilt his/her head sideways. This is generally applicable to people with broader faces.

Iris area: If the increase in Iris area improves the rating, then the user is suggested to open his eyes little wider or vice versa.

Sclera area: If the increase in the sclera area improves the rating, the user can be asked to look sidewise.

Nostril area: If the reduction in nostril size improves the rating, the user can be asked to tilt his face downwards slightly.

Upper/Lower Lip area: If the increase in Upper/lower lip area improves the rating, the user can be asked to smile broadly.

Lips dark area: If the reduction in lips dark area improves the rating, the user can be asked to use lighter lip shades or vice versa.

FIG. 6 illustrates the transformed faces 600 of the yaw-pitch rotations of faces marking the plurality of sections to identify the one or more faces of the various combinations in accordance with an embodiment of the present invention.

Figure 7:
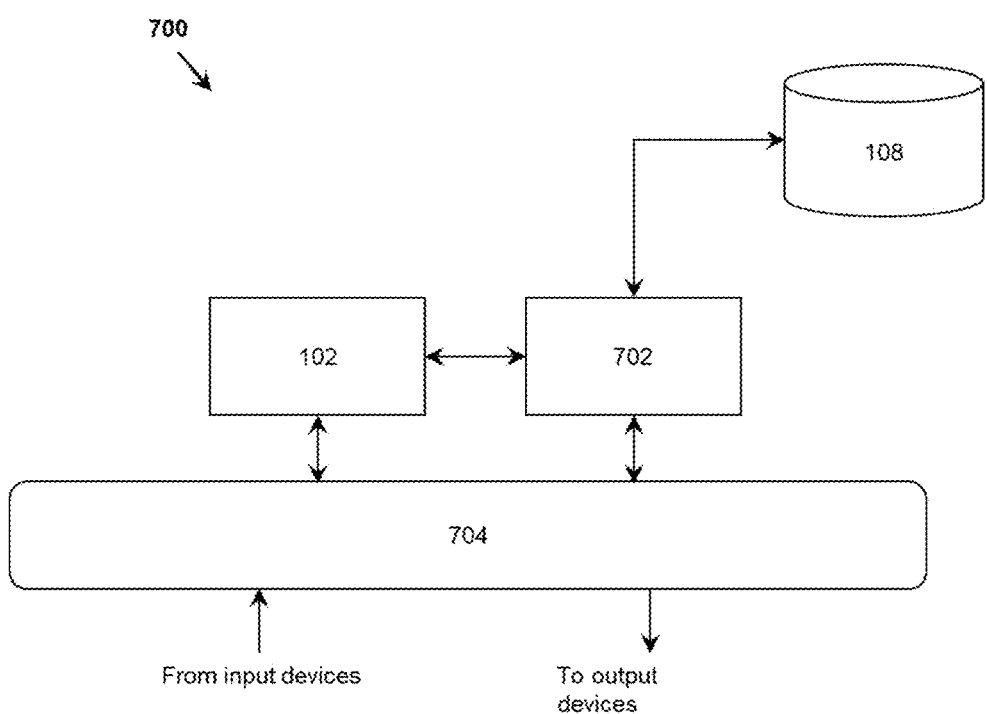
FIG. 7 illustrates a system for providing feedback on improvising the selfie in an original image, in accordance with an embodiment of the present invention.

FIG. 7 illustrates a system 700 for providing feedback regarding facial expressions in an original image, in accordance with an embodiment of the present invention. As shown in FIG. 7, the system 700 comprises of the image capturing device 102, an interface module 704 and a control module 702.

The interface module 704 is, but not limited to, an user-friendly interface which enables one or more users to receive feedback in graphical or visual or textual form.

The control module 702 is envisaged to include computing capabilities such as a memory unit (not shown) configured to store machine readable instructions. The machine readable instructions may be loaded into the memory unit from a non-transitory machine-readable medium such as, but not limited to, CD-ROMs, DVD-ROMs and Flash Drives. Alternately, the machine readable instructions may be loaded in a form of a computer software program into the memory unit. The memory unit in that manner may be selected from a group comprising EPROM, EEPROM and Flash memory.

Further, the control module 702 includes a processor (not shown) operably connected with the memory unit. In various embodiments, the processor is one of, but not limited to, a general purpose processor, an application specific integrated circuit (ASIC) and a field-programmable gate array (FPGA).

As shown in FIG. 7, the control module 702 is configured to receive 2-dimensional images of one or more users from the image capturing device 102. Thereafter, the control module 702 identify respective one or more faces of the one or more users from the 2-dimensional images and determine values of a set of plurality of parameters associated with a plurality of sections of each face of the one or more faces. The determined values of the set of plurality of parameters are compared, by the control module 702, with pre-determined optimum values of set of plurality of parameter pre-stored in the data repository 108. Based on the data of comparison captured images are rated. With the help of this rating, the top attractive images are displayed to one or more users. 2-dimensional image is then converted to 3-dimensional image and the various combinations of yaw-pitch-roll for the different angles of faces is determined as shown in FIG. 6. The set of plurality of parameters associated with a plurality of sections of each face of the one or more combinations is determined by the system 702. The plurality of parameters are, but not limited to, height, width, breadth, pixel count etc. of plurality of sections of the respective one or more faces. The plurality of sections are, but not limited to, Iris area, scalera area, nose area, nostril area, upper lip area, lower lip area, lip dark area and face area. Further, the system 702 calculate the proportion of the values of the plurality of parameters of the plurality of sections against the face area and then compare the estimated proportion values with the pre-determined optimum values of set of plurality of parameter pre-stored in the data repository 108. The pre-determined optimum values are determined by using analysis of data and neural network based deep learning trained data set. The control module 702 then provides the analysis of the comparison to interface module 704 which provides the feedback to the one or more users on the basis of the comparison. The feedback is, but not limited to Face area: If the decrease in face area improves the rating, the user can be suggested to tilt his/her head sideways. This is generally applicable to people with broader faces.

Iris area: If the increase in Iris area improves the rating, then the user is suggested to open his eyes little wider or vice versa.

Sclera area: If the increase in the sclera area improves the rating, the user can be asked to look sidewise.

Nostril area: If the reduction in nostril size improves the rating, the user can be asked to tilt his face downwards slightly.

Upper/Lower Lip area: If the increase in Upper/lower lip area improves the rating, the user can be asked to smile broadly.

Lips dark area: If the reduction in lips dark area improves the rating, the user can be asked to use lighter lip shades or vice versa.

It should be noted that where the terms "server", "secure server" or similar terms are used herein, a communication device is described that may be used in a communication system, unless the context otherwise requires, and should not be construed to limit the present disclosure to any particular communication device type. Thus, a communication device may include, without limitation, a bridge, router, bridge-router (router), switch, node, or other communication device, which may or may not be secure.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof.

Further, the operations need not be performed in the disclosed order, although in some examples, an order may be preferred. Also, not all functions need to be performed to achieve the desired advantages of the disclosed system and method, and therefore not all functions are required.

The terms and descriptions used herein are set forth by way of illustration only and are not meant as limitations. Examples and limitations disclosed herein are intended to be not limiting in any manner, and modifications may be made without departing from the spirit of the present disclosure. Those skilled in the art will recognize that many variations are possible within the spirit and scope of the disclosure, and their equivalents, in which all terms are to be understood in their broadest possible sense unless otherwise indicated.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

What is claimed is:

1. A computer system (106) for providing feedback regarding facial expressions in an original image, the computer system (106) comprising:
   a memory unit (1062) configured to store machine-readable instructions; and
   a processor (1064) operably connected with the memory unit (1062), the processor (1064) obtaining the machine-readable instructions from the memory unit (1062), and being configured by the machine-readable instructions to:
      receive 2-dimensional images of one or more users from an image capturing device (102);
      identify respective one or more faces of the one or more users from the 2-dimensional images;
      determine a face area and values of a plurality of parameters associated with a plurality of sections of each face of the one or more faces;
      calculate one or more proportion values of each of the values of the plurality of parameters associated with the plurality of sections against the face area;
      compare the one or more proportion values with one or more pre-determined optimum values of the plurality of parameters pre-stored in a data repository (108) to outcome a comparison result;
      rate the captured images on a basis of the comparison result;
      convert the 2-dimensional images to one or more 3-dimensional images;
      determine one or more combinations of yaw-pitch-roll for a plurality of different angles of faces;
      estimate one or more values of a second set of plurality of parameters associated with a plurality of sections of each face of the one or more combinations of the yaw-pitch-roll;
      calculate a second set of proportion values of the one or more values of the second set of plurality of parameters associated with the plurality of sections against the face area;
      compare the second set of proportion values with a second set of pre-determined optimum values pre-stored in the data repository (108) to outcome a second comparison result; and
      provide feedback on pose, facial expressions and face angle to the one or more users on a basis of the second comparison result.

2. The computer system (106) as claimed in claim 1, wherein the image capturing device (102) is selected from a group of a digital camera, a handy cam or a camera-enabled smartphone.

3. The computer system (106) as claimed in claim 1, wherein the step of identifying (210) respective one or more faces further comprises a step of marking the plurality of sections of the respective one or more faces.

4. The computer system (106) as claimed in claim 1, wherein the plurality of sections are selected from Iris area, Sclera area, Nostril area, Nose area, Upper lip area, Lower lip area, Lips dark area and face area.

5. A system (700) for providing feedback regarding facial expressions in an original image comprising:
   an image capturing device (102);
   an interface module (704); and
   a control module (702);
      wherein the control module (702) is configured to
         receive 2-dimensional images of one or more users from an image capturing device (102);
         identify respective one or more faces of the one or more users from the 2-dimensional images;
         determine a face area and values of a plurality of parameters associated with a plurality of sections of each face of the one or more faces;
         calculate one or more proportion values of each of the values of the plurality of parameters associated with the plurality of sections against the face area;
         compare the one or more proportion values with one or more pre-determined optimum values of the plurality of parameters pre-stored in a data repository (108) to outcome a comparison result, wherein the pre-determined optimum values are determined by using analysis of data and neural network based deep learning trained data set;
         rate the captured images on a basis of the comparison result;
         convert the 2-dimensional images to one or more 3-dimensional images;

determine one or more combinations of yaw-pitch-roll for a plurality of different angles of faces;

estimate and one or more values of a second set of plurality of parameters associated with a plurality of sections of each face of the one or more combinations of the yaw-pitch-roll;

calculate a second set of proportion values of the one or more values of the second set of plurality of parameters associated with the plurality of sections against the face area;

compare the second set of proportion values with a second set of pre-determined optimum values pre-stored in the data repository (108) to outcome a second comparison result;

wherein the interface module (704) is configured to provide feedback on pose, facial expressions and face angle to the one or more users on a basis of the second comparison result.

6. The system (700) as claimed in claim 5, wherein the image capturing device (102) is selected from a group of a digital camera, a handy cam or a camera-enabled smartphone.

7. The system (700) as claimed in claim 5, wherein the control module (702) is further configured to mark the plurality of sections of the respective one or more faces, after identification of the respective one or more faces.

8. The system (700) as claimed in claim 5, wherein the plurality of sections are selected from Iris area, Sclera area, Nostril area, Nose area, Upper lip area, Lower lip area, Lips dark area and face area.

* * * * *